United States Patent [19]

Partridge, III

[11] Patent Number: 5,608,778
[45] Date of Patent: Mar. 4, 1997

[54] CELLULAR TELEPHONE AS AN AUTHENTICATED TRANSACTION CONTROLLER

[75] Inventor: B. Waring Partridge, III, Far Hills, N.J.

[73] Assignee: Lucent Technologies Inc., Murray Hill, N.J.

[21] Appl. No.: 310,441

[22] Filed: Sep. 22, 1994

[51] Int. Cl.$^6$ .................................................. H04Q 7/20
[52] U.S. Cl. ................................. 379/58; 379/91; 379/59
[58] Field of Search ............................... 379/58, 59, 62, 379/91, 144; 380/23

[56] References Cited

U.S. PATENT DOCUMENTS

| | | | |
|---|---|---|---|
| 4,860,336 | 8/1989 | D'Avello et al. | 379/91 |
| 5,109,401 | 4/1992 | Hattori et al. | 379/91 |
| 5,138,649 | 8/1992 | Krisbergh et al. | 379/58 |
| 5,138,650 | 8/1992 | Stahl et al. | 379/91 |
| 5,204,902 | 4/1993 | Reeds, III et al. | 380/23 |
| 5,390,252 | 2/1995 | Suzuki et al. | 379/62 |

*Primary Examiner*—Dwayne D. Bost

[57] ABSTRACT

An arrangement to provide credit to customers via cellular telephones. In one embodiment, a customer seeking credit for the purchase of goods and services from a merchant activates his or her cellular telephone, authenticates the cellular telephone with his cellular service provider's base station, and proceeds to establish a connection to obtain credit. Credit is obtained by sending unique sequence to the cellular service provider that is different from the normal sequence of numbers that correspond to a telephone number of the called party. That sequence may include a merchant ID code and the amount of credit desired.

14 Claims, 4 Drawing Sheets

CELLULAR TELEPHONE AS AN AUTHENTICATED TRANSACTION CONTROLLER

BACKGROUND OF THE INVENTION

This invention relates to wireless telephones and processes for use of such a telephone to secure action on behalf of the telephone's holder.

Today, wireless telephones are used exclusively for telecommunication, while other devices are used to secure action on behalf of a user. For example, Infra-Red remote control devices are used to control TVs and VCRs; house keys are used to secure entry to a premises, credit cards are used to obtain consumer credit, etc. All of these activities can be classified as "control transactions", because control is exercised by the user to obtain some desired result or benefit. Some of those transactions are free, such as securing entry to one's own home or controlling the reception of free channels of a TV. Others are not free, such as securing entry to a theater, selecting a "pay per view" TV channel, obtaining consumer credit, etc.

It is an object of this invention to allow users to employ their wireless telephones to effect such control transactions; and in connection with control transactions that are not free, it is an object of this invention to allow the cost of such control transactions to be borne by the credit account that the wireless telephone holder has with the wireless service provider or another party.

SUMMARY OF THE INVENTION

In accordance with the principles of this invention, wireless telephones are used to secure action on behalf of a user and form, thereby, transaction controllers. The procedure is grounded in the authentication protocol that wireless telephones engage in when activated. Once the wireless telephone is authenticated, a control command is issued by the telephone (or effectively by the telephone) and, if necessary, a credit sum is authorized to be debited against the credit account that the wireless telephone holder has with the wireless service provider.

In applications where consumer credit is sought to be received, for example, a customer seeking credit for the purchase of goods and services from a merchant activates his or her wireless telephone, authenticates the wireless telephone with his wireless service provider's through the local base station, and proceeds to establish a "conversation" to obtain credit. Credit is obtained by sending unique sequence to the wireless service provider that may be different from the normal sequence of numbers that correspond to a telephone number of the called party. That sequence may include a merchant ID code (which identifies the merchant) and, of course, the amount of credit desired. It may also include other information, such as the items purchased or service received, etc.

In another embodiment, radio reception equipment of the merchant intercepts the information sent to the base station, appends information about the merchant and the amount of credit desired, and forwards that information to the credit-providing organization; i.e. the organization that holds the account of the wireless telephone's holder. The communication with the credit-providing organization may take place through wireless transmission or through landline transmission.

When the request for credit is deemed proper, a message is sent to the merchant, authorizing the extension of credit, and the transaction terminates successfully.

In an application where the control transaction does not need to access the credit line of the wireless telephone holder, and where only authentication is important—such as when using the wireless telephone to open the garage door to one's home, the random signal of a wireless base station is combined to send a signal that can be authenticated. When it is so authenticated, the control transaction is executed.

DETAILED DESCRIPTION

For illustrative and expository purposes, the disclosure herein begins by describing the process of extending and obtaining consumer credit, where authentication and exchange of value are paramount. Then, it describes the process of gaining access to a home, where authentication is essential. Finally, it describes the process of controlling appliances, such as a TV, where only command and control capabilities are the primary concerns. The description below deals with cellular telephones and the protocols that are adapted for cellular telephones. It should be understood, however, that the instant invention is broader than the use of cellular telephones, as compared to other wireless telephones.

1. Extending Credit

Today, the process of extending consumer credit is a fairly mundane operation. An organization such as a bank offers credit to a customer, provides the customer with a credit card, and the customer uses the credit card to purchase goods and services. When goods and services are purchased, a charge is made against the customer's credit, at the end of a billing cycle the organization sends out a statement to the customer and, in due course, the customer compensates the organization for the credit that it extended.

Of course, a person wishing to get a credit card needs to find an organization that would extend this credit. But, while finding an organization that would extend credit is not a particularly difficult hurdle for many people, it bears pointing out that most credit customers already have a creditor/debtor relationship with two or more communication carriers (local exchange service, long distance carrier, cellular carrier). The question arises, then, whether this prevalent relationship can be used to extend general consumer credit. Now that an increasing number of people are carrying cellular telephones, it would certainly be advantageous to make use of this relationship and do away with credit cards altogether.

The arrangements and processes described below provide this capability.

Figure 1:
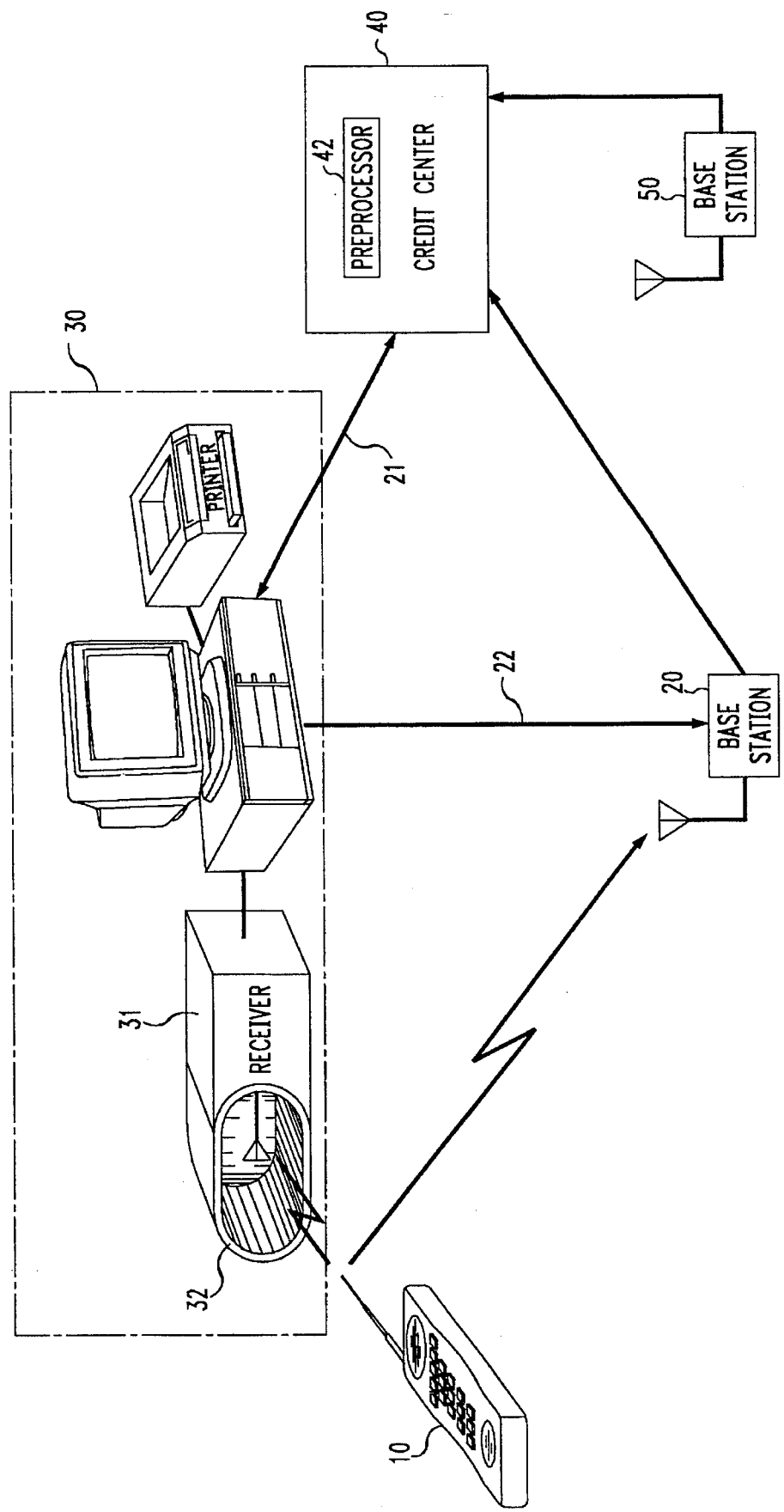
FIG. 1 depicts an arrangement for carrying out the objectives set forth above.

FIG. 1 depicts a cellular telephone 10 that is adapted for wireless communication with a base station 20. Base station 20 communicates with a credit center 40, and credit center 40 communicates with merchant's equipment 30. Base station 50 also communicates with credit center 40.

Credit center 40 and the cellular service providers that operate base stations 20 and 50 can be one and the same organization, but they need not be. Typically, credit center 40 is the billing arm of the organization that provides the cellular service to the user. For example, base station 20 can belong to cellular service provider A, base station 50 can belong to cellular service provider B, and the bona fide holder of cellular telephone 10 has a contractual relationship with provider B. Under these assumptions, center 40 is the billing organization of provider B.

Also, channel 21 which connects equipment 30 to credit center 40 can be wired or wireless. Any convenient protocol can be employed for communicating between equipment 30 and credit center 40, provided that secure authentication can take place.

The basic transaction in the context of obtaining consumer credit is for cellular telephone 10 to charge a chosen amount to its account with credit center 40 and to inform a merchant that he/she will get the benefit of this charging against the telephone holder's account. It is presumed that cellular telephone 10 is in the hands of a bona fide customer. The protocol that one might engage when there is a doubt regarding the bona fide of the person possessing the cellular telephone is not described here, for sake of brevity. It may include, for example, use of a customer personal identification code, voice authentication, etc. It is recognized. however, that one of the challenges is to insure that both the customer and the merchant to receive the benefit of the extended credit. Another challenge is to provide this interaction in a secure manner so that neither the customer nor the merchant can be disadvantaged. Still another challenge is to provide this interaction so that a third party can not be disadvantaged by, or take advantage of, this communication.

Figure 2:
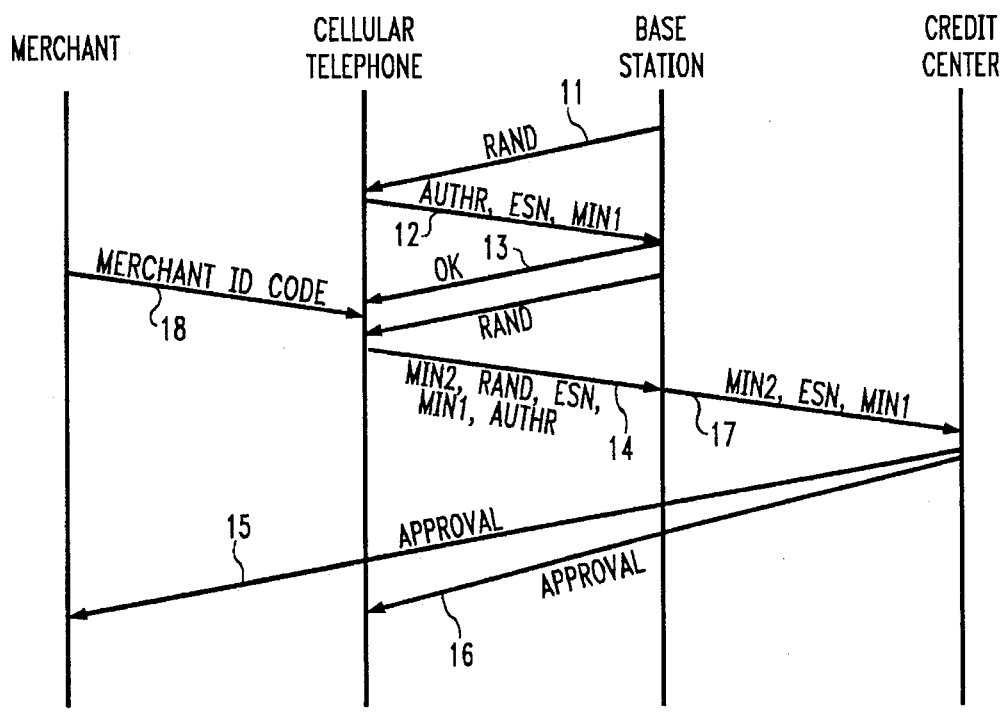
FIGS. 2–4 present flow diagrams of illustrative protocols that incorporate the principles disclosed herein.

These objectives are realized with the protocol presented in FIG. 2, which generally follows the teachings found in U.S. Pat. No. 5,204,902, issued to Reeds et al on Apr. 20, 1993. This patent is hereby incorporated by reference.

To briefly describe the teachings of the Reeds et al patent, each cellular telephone possesses a "shared secret data" (SSD) digital data string that is derived from a hashed combination of a secret key (A-key), the cellular telephone's equipment number (ESN), the cellular telephone's assigned number (MIN1), and a random string that is selected by the organization with which the cellular telephone user has a business relationship. Typically, that organization is a cellular service provider with whom the customer "signed up"; i.e., maintains a contractual relationship to pay for accrued charges.

Cellular service providers are usually limited to a particular geographic area. That area is the "home" cellular geographic service area (home CGSA) of that customer. For purposes of this description, the home CGSA of cellular telephone 10 is base station 50. Base station 20, in whose cell cellular telephone 10 is present, is the "visited" host CGSA. The SSD string is divided into two strings, the SSDA and SSDB. The SSDA string is used for authentication, and the SSDB string is used for communication encryption.

In operation, each cell in a cellular communication network is serviced by a base station (e.g., base stations 20 and 50). The base station broadcasts a random sequence (RAND) at some selected repetition rate, and changes that RAND relatively often for enhanced security (e.g. more often than the duration of most cellular calls). When a cellular telephone that is located in a cell is turned on, it receives the RAND sequence and responds by introducing itself to the cell (telephone 10 receives the RAND transmitted by base station 20). This is the registration process, and it is depicted by lines (processes) 11, 12 and 13 in FIG. 2.

Describing processes 11, 12 and 13 more specifically, the cellular telephone concatenates its ESN and MIN1 strings with the SSDA and the RAND strings, and hashes the resulting string to obtain the AUTHR string. It then transmits the AUTHR string together with the RAND, ESN and MIN1 strings to the base station for confirmation. As an aside, the RAND signal is sent because the base station may have changed its RAND between the time RAND was received by cellular telephone 10 and the time AUTHR is received by the base station; but that is optional because the base station can easily remember its last RAND string.

The base station detects the ESN and MIN1 strings and determines therefrom the asserted identity of the cellular telephone and the identity of the home CGSA. As an aside, in order to identify the home CGSA an algorithm may need to applied to the ESN and MINI strings, or a database may need to be consulted. Base station 20 receives the SSD string from the home CGSA, which in the FIG. 1 example is base station 50, combines the SSDA with the RAND, ESN and MIN1 strings, and hashes the resulting string to obtain its version of an AUTHR string. It then compares its version of the AUTHR string to the received version of the AUTHR string. When the two strings match, a determination is made that the cellular telephone is bona fide. A "go ahead" signal (line 13) is then sent from the base station to the cellular telephone, and it includes information regarding the specific frequency the cellular telephone should use for further communication.

Having been registered by the serving base station, the cellular telephone can initiate calls with a process that concatenates at least some of the called party's phone number to the other strings. That is, the cellular telephone may transmit a MIN3 string, which is the called party's information, together with the RAND, ESN, MIN1 strings, and a new AUTHR string. The new AUTHR string is derived from a hash of the concatenation of RAND, ESN, MIN1, MIN3 and SSDA. (This is not shown is FIG. 2 because there is no call made to a third party.)

Once the conversation is established with the base station, actual communication of information can proceed—encrypted with SSDB, if desired. To further preserve security, the base station can request a re-authentication at any time, in a manner not unlike the initial registration described above.

Returning to the challenge of obtaining consumer credit to the holder of cellular telephone 10, the most elemental protocol that is required in order to grant credit and charge an account of that user in credit center 40, includes the steps of:

a) communicating to credit center 40 and giving it the necessary information regarding the account to be charged, and the sum that should be charged to that account, and b) informing the merchant, through merchant's equipment 30, that the merchant will be credited with the requested sum. Advantageously, additional steps can be incorporated to insure that the right account is charged with the provided credit, that the right merchant is credited with the requested sum, and that no interlopers can cause present or future harm to the merchant, to credit center 40 or to the user of cellular telephone 10, etc.

In one of its simpler forms, the detailed protocol includes the following steps.

a) The merchant provides to the customer a unique code that identifies the merchant to credit center 40 (line 18 in FIG. 2);

b) The customer presses into telephone 10 a prefix, such as "*9", the merchant's ID code, and the sum of money that should be charged to the customer's account and credited to the merchant. That forms the string MIN2.

c) Cellular telephone 10, having been previously registered with base station 10 and having the data of step (b) entered into its buffer, in response to the "send" command transmits the MIN2, RAND, ESN, MIN1 and AUTHR strings, where the AUTHR string is derived from a hash of the concatenation of RAND, ESN, MIN1, MIN2 and SSDA (line 14 in FIG. 2).

d) When base station receives the transmitted information, it recognizes (e.g., from the "*9" string) that this is not a normal call but, rather, an effort to reach credit center 40. In response, center 40 is contacted and the relevant information is conveyed; that is, the ESN, MIN1 and MIN2 data (line 17 in FIG. 2). The authentication protocol of base station 20 effectively insures that cellular telephone 10 is indeed the telephone corresponding to the received ESN and MIN1 and, therefore, center 40 is in a position to evaluate whether the customer of MIN1 deserves to get credit.

e) When credit center 40 determines that telephone 10 should be granted the credit, it sends an approval code to merchant's equipment 30 and, perhaps, to the cellular telephone as well (lines 15 and 16 in FIG. 2). Reception of the approval successfully accomplishes the desired transaction. The actual posting of the credit against the customer's credit account can be done in conventional ways, and it can also be done by changing the billing rate of the communication with cellular telephone 10, as is done in "900 service".

One slight awkwardness with the above-disclosed protocol is that the merchant needs to provide the customer with its code, and if this step is carried out through oral communication then it is expected that errors will occur. Additionally, the fact that credit center 40 needs to contact merchant's equipment is a slight disadvantage because that entails use of a database that translates the merchant's code to (typically) a telephone number, and the process of establishing a communication path takes additionally time.

These deficiencies are overcome with a slightly altered approach where the merchant contacts credit center 40—rather than the other way around—and where the merchant electronically supplies its identification code to the credit center. Of course, the communication between telephone 10 and center 40 via base station 20 must be linked to (in the sense of being correlated with) the communication between merchant 30 and center 40. The link can be established by the merchant and the customer agreeing to use a selected transaction password (TP string). This string can be random and transitory; e.g., used only once. The customer can enter the TP string instead of the merchant's ID code and send that to base station 20, and the merchant can use the same TP in the merchant's communication with credit center 40. The TP string can be communicated from the merchant to the customer orally, with the customer inserting that code into the cellular telephone. This eliminates the danger of a nearby cellular telephone inadvertently participating in the communication and having its credit account debited. Since the TP string is used only once, there is no value to it for an interloper, and an error in this step merely causes the transaction to fail in a very clear manner. When that happens, the customer and the merchant can re-enter the TP string (or a different TP string) and try again.

In accordance with this modified protocol, the telephone's communication is as before. The difference lies in the fact that the merchant's equipment contacts the credit center, identifies itself, provides the TP string and, when appropriate, receives the approval, or authorization, from the center.

Figure 3:
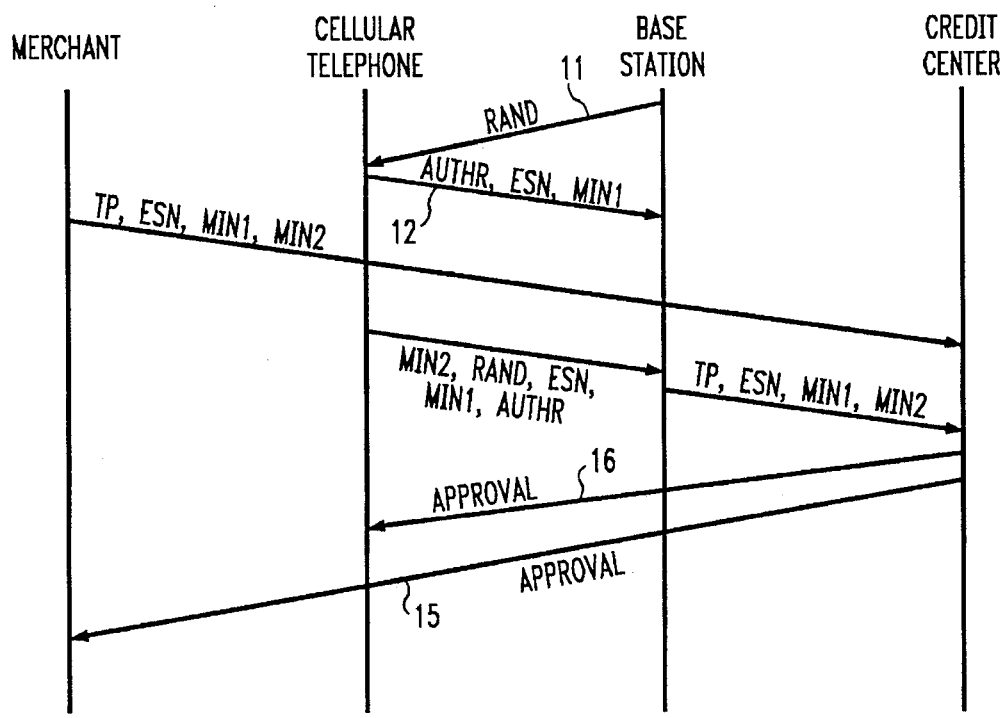

To help credit center 40 link the TP string provided by the merchant to the transmission by telephone 10, it would be advantageous for merchant's equipment 30 to include the ESN and MIN1 of telephone 10. This protocol is presented in FIG. 3.

Of course, equipment 30 must receive the ESN and MIN1 information from telephone 10, and that can be achieved with a receiver 31 associated with equipment 30. Such a receiver can be a low-sensitivity receiver, because the customer purchasing the goods and services is expected to be in close proximity to the receiver and because the merchant indeed desires to not receive transmission from neighboring cellular telephones.

Reception of just the right cellular telephone can be assured by more than just employing a weak receiver. For example, the receiver of equipment 30 can be set to discard all receptions from cellular telephones that do not transmit the TP string. Or, equipment 30 can include a metallic shroud 32 around an antenna 31 into which the antenna of telephone 10 is inserted, causing only that signal to be received by antenna 31.

Figure 4:
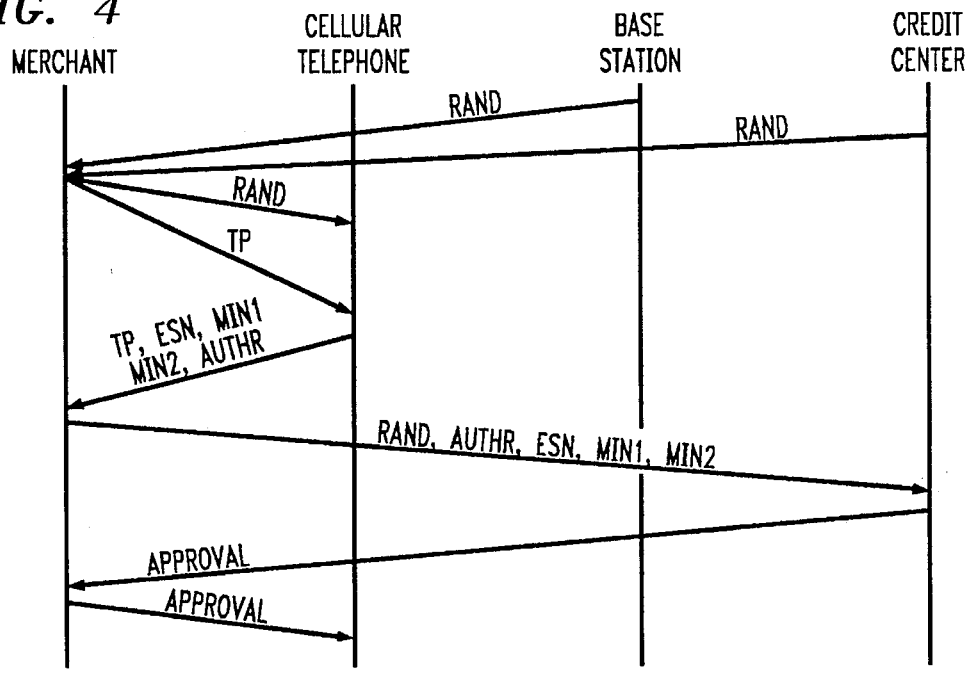

With receiver 31 introduced into equipment 30, communication between telephone 10 and base station 20 need not necessarily take place or, in any event, need not necessarily take place directly. That is, equipment 30 can capture the transmission of telephone 10, add whatever data it desires, and forward the combined information to credit center 40 via base station 20 (using path 22 in FIG. 1). Alternatively, equipment 30 can bypass base station 20 and send its data directly to credit center 40 where preprocessor 42 receives the data and emulates the registration process of base station 20. As depicted in FIG. 4, merchant's equipment 30 can obtain the RAND string from preprocessor 42 and send it to wireless telephone 10. Concurrently, the merchant can give the TP string to the user of wireless telephone 10. Wireless telephone 10 creates a string that comprises the transaction password string (TP), the ESN and MIN1 strings, optionally the MIN2 string, and AUTHR validation string (i.e., the TP string is embedded in the AUTHR string). Equipment 30, in turn, communicates that information to preprocessor 42, adding the TP string, the sum, its ID code and, perhaps, the RAND string. Preprocessor 42 confirms the bona fide of the user requesting credit by analyzing the AUTHR string vis-à-vis the other data sent by equipment 30 and determines whether to grant credit. Its decision is then communicated to equipment 30 and, optionally, to wireless telephone 10. A written confirmation of the amount charged to the customer's account can be had from a printout provided to the customer by the merchant and, if desired, the printout can be signed by the customer for a backup validation of the charge. Such a printer is shown as device 33 in FIG. 1.

In terms of the hardware needed for the system of FIG. 1, the equipment is completely conventional. Cellular telephone 10 is a conventional cellular telephone, and so are base stations 20 and 50. The merchant's equipment is simply a receiver that is akin to, but much simpler than, the receiver in base station 20. All it needs to do is discriminate in its reception of signals in favor of the right incoming signal. In this case, it is expected that the cellular telephone of the customer wishing to make a purchase will be at least twice as close to the merchant's receiver than the next nearest active cellular telephone. Shroud 32 would make such discrimination error more effective. Therefore, a discrimination based on incoming power would be simple and effective. It may be remembered, however, that such discrimination can be also had by simply confirming that the TP string is contained in the communication from cellular telephone 10. That would require the cellular telephone to output the TP string "in the clear" as well as embedded in AUTHR.

In addition to the receiver, merchant's equipment 30 requires a means for appending information to the received data and sending that data to credit center 40. Such equipment can be realized easily with a conventional PC, or with even less versatile and less expensive special hardware arrangements. The printer can be any of the printers commonly used today in connection with conventional credit cards.

As for credit center 40, it is mostly a communication and database hub that is not unlike present day cellular provider's business offices.

2. Coming Home

After a shopping trip such as intimated above, a holder of cellular telephone may wish to gain access to his or her home by having the garage door open under control of the same cellular telephone. For this purpose, credit center 40 need not be involved because credit is not being extended (except, of course, if a charge is incurred for the contributions made to this control transaction by the base station). While the outlined task is one of mere control over the garage door opener, as described below it can still involve telecommunication, although that is not a requirement.

In a telecommunication embodiment, a garage door opener is merely a cellular telephone receiver followed by an additional deciphering means. In operation, the garage door opener is registered with the cellular base station, and the base station is capable of installing therein the SSDA and the SSDB strings. In short, the base station can communicate with the garage door opener in a secure manner, almost as with other cellular telephones; the difference being that it is only one way communication—from the base station to the garage door receiver.

When the cellular telephone 10 wishes to have the garage door opened, it requests the base station to make a call to the garage door receiver and forward to that receiver a command data string. The data string comprises a random number (RANDX) that is "punched in" by the holder of the cellular telephone (that is the TP, transaction password, for this transaction) and a hashing of that random number with key (B-Key) which is stored in cellular telephone 10.

As indicated above, the receiver contains a deciphering means that recovers the string that had been hashed with the B-Key. When the deciphered random number corresponds to the random number received "in the clear", the garage door is opened. This protocol is depicted in FIG. 5, where lines 11, 12 and 13 represent the registration process as described in connection with FIG. 2.

Figure 5:
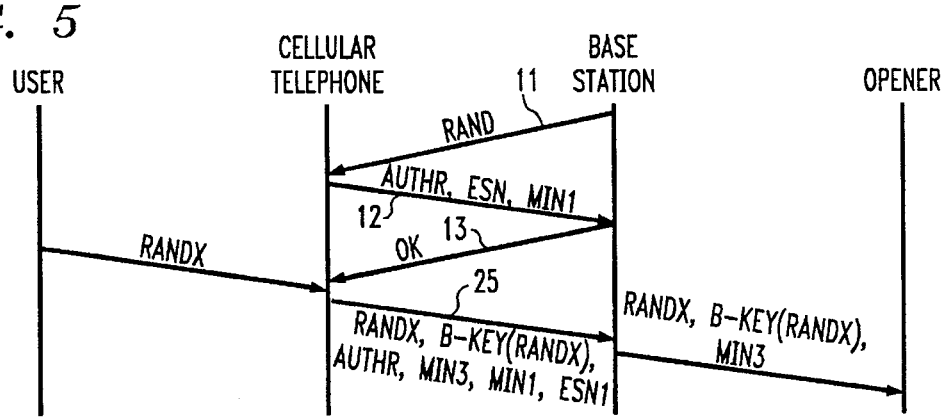
FIGS. 5–6 show flow diagrams for a secured control application.

It may be observed that the cellular telephone follows a slightly different protocol in FIG. 5 than the protocol of normal telephone connections. Specifically, instead of sending merely the called party's telephone number (MIN3) and waiting for an indication from the base station that the called party answered, the RANDX and B-Key(RANDX) strings are immediately appended. This is easily accomplished in the cellular telephone by selecting sequence that the cellular telephone can readily recognize (and which does not correspond to an otherwise valid string), e.g. "*8", followed by the user-supplied RANDX string.

In the alternative, cellular telephone 10 can send the MIN3 as expected, wait for a clear-to-send signal, and then forward the remainder of the sequence.

In an embodiment that does not involve telecommunication, the cellular base station is still involved in the sense that the cellular telephone automatically interacts with the base station and registers itself as soon as the cellular telephone is turned on. Stated in other words, like it or not, when the cellular telephone is turned on, it registers itself with the base station. This activity, normally, does not produce a charge against the credit account of the cellular telephone's holder. Beyond this registration point, in an embodiment that does not involve telecommunication the objective is to open the garage door without assistance from the base station.

Figure 6:
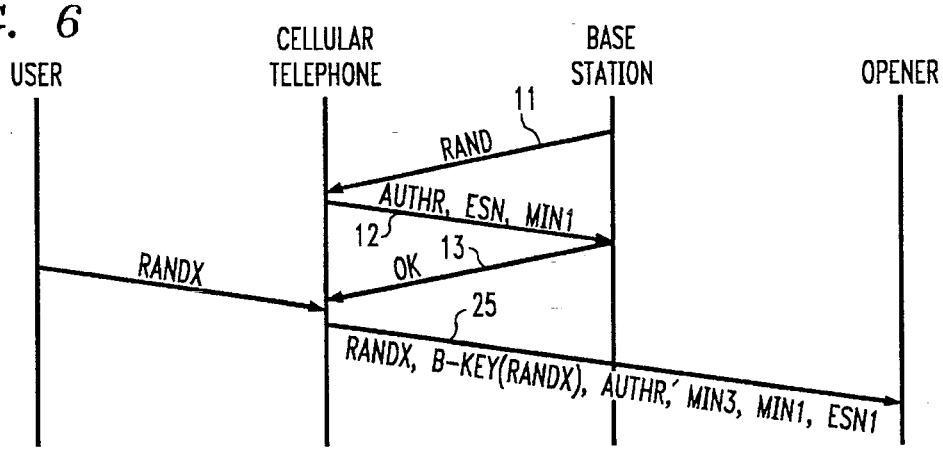

This can be accomplished in a number of ways, but all require that the signal sent to the base station following the "go ahead" signal of line 13 (in FIG. 5) should be unintelligible to the base station. Conversely, the garage door receiver should be tuned to that transmission from the cellular telephone and should understand the transmission. This can be achieved, for example, by the garage door receiver eavesdropping on the base station's "go ahead" transmission that instructs the cellular telephone to operate at a particular frequency. The receiver can then tune itself to that same frequency and capture the cellular telephone's transmission. As shown in FIG. 6, when cellular telephone 10 then sends the signal of line 25 in FIG. 5, the receiver intercepts it, deciphers it, and the garage door responds accordingly. In such an embodiment, MIN3 would be a string that is not recognized by the base station, or AUTHR would be deleted, or merely altered, to cause a rejection by the base station. Alternatively, when the "*8" sequence is inserted into cellular telephone 10, it can tune itself to the fixed hailing frequency that is used for registration. For such a realization, the garage door opener can be permanently tuned to that hailing frequency.

It may be mentioned in passing the above-presented example of opening a garage door is just that: an example. Other control applications, such as unlocking a cat's door or one's house, activating an alarm, etc. are all within the scope of this invention.

3. Extended Control

Figure 7:
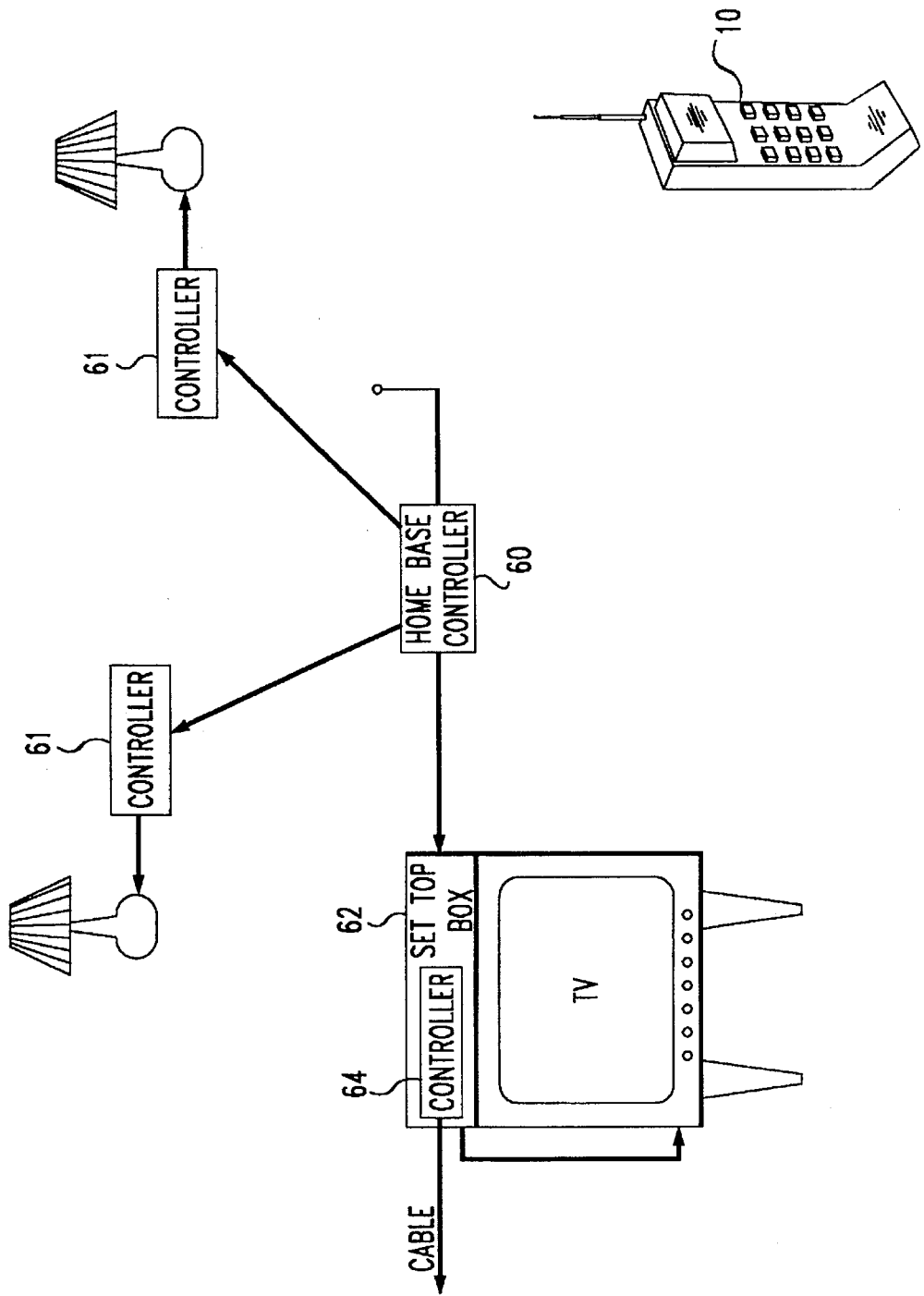
FIG. 7 illustrates a home controller base station arrangement.

Having gained the desired access to the home, the holder of a cellular telephone 10 may wish to control various appliances. In such an application, security is not the concern it was in the two applications disclosed above. Also, from a public policy standpoint it may be desirable to not involve the base station is such control applications. The latter can be effected by simply changing the operating frequency of the cellular telephone to a band that is not covered by the base stations. In operation, each home can have its own home controller base station that operates at a selected frequency. Through a switch or a "punched in" code, the cellular telephone can be placed in a "home controller" mode, and in that mode the cellular telephone interacts solely with the home controller base. The home controller base can then perform whatever controls are assigned to it, using conventional techniques. The authentication process can still take place, as before, but under control of the home controller base station. That is, the home controller base can include the capability to authenticate the cellular telephone qua home controller but it doesn't have to, or it can selectively do so, based on the desired interaction. For example, the cellular telephone qua home controller can be used to change TV channels, and for that, perhaps, some security measures may be desired; but it can also be used to interact with the supplier of the television signals, for which security may not be sought. Purchases can be made through such interactions, and the owner of a home controller base may not mind having a visitor use the home controller base as a conduit. The arrangement disclosed above is illustrated in FIG. 7, which includes a home base station 60, various home controllers 61 that control appliances, for example, a television "set top box" 62, a television 63 and means 64 for interacting with a supplier of goods and/or services that are advertised on the television. Such means may be the portion of the set top box that sends signals back to the supplier of the television signals (so depicted), but it doesn't have to be.

It should be noted that the principles disclosed herein are not limited to cellular telephones. Any wireless means can achieve the capabilities that are disclosed herein as long as such means has the authentication capabilities that are appropriate for the application at hand; and as indicated above, for some applications the desired authentication capabilities are not significant or unneeded at all.

What is claimed is:

1. A method carried out by a first party, comprising the steps of:

receiving signals emitted by a communication device held by a second party, which signals identify the communication device;

based on said signals, authenticating the identity of the communication device; and communicating a response signal to a third party to induce said third party to perform an action to benefit said second party, other than an action associated with the establishment of communication between the second party and another party.

2. The method of claim 1 wherein the step of authenticating employs a protocol that, at least in part, corresponds to at least a part of a registration protocol employed by the communication device to enable the communication device to receive or initiate calls.

3. The method of claim 1 wherein the communication device is a cellular phone, and the step of authenticating employs a protocol that, at least in part, corresponds to a registration protocol employed by the cellular phone.

4. The method of claim 1 wherein the action on behalf of the user is the transmission of a secure control signal to a specified destination.

5. The method of claim 1 wherein the action on behalf of the user is the transmission of a control signal to a destination.

6. The method of claim 4 where the destination is a home controller base station.

7. The method of claim 4 where the destination is a home controller base station that interacts with a party that provides signals to a television set.

8. A method for providing credit to a first party and a payment to a second party, where the first party possesses a wireless telephone and has a relationship with a credit-providing center, comprising the step of:

said credit-providing center determining an approval status for credit desired by the first party based on identity of the telephone when it communicates with the credit-providing center, and said credit-providing center sending an approval message to said second party in response to said determining that induces the second party to perform an action for the benefit of the first party other than an action associated with the establishment of communication with the wireless telephone.

9. The method of claim 8 wherein identity of the telephone is established based on a protocol used by the wireless telephone to to register itself with a telecommunications carrier.

10. An arrangement for providing credit to a first party for the benefit of a second party, where the first party has a wireless telephone and a relationship with a credit-providing center comprising:

first means, responsive to signals received from the wireless telephone for identifying the wireless telephone to the credit center using an identification protocol that comports with an identification protocol used by the wireless telephone for wireless communication;

second means, responsive to signals received from the wireless telephone that specify a credit sum and an identification of said second party for associating said sum and said second party with the wireless telephone identified by said first means; and third means for the credit center communicating an approval status to said second party.

11. The arrangement of claim 10 wherein said first means comprises a cellular telephone base station and a communication link between the base station and the credit center.

12. The arrangement of claim 10 wherein said first means comprises transmission apparatus on premises of said second party for communicating with the credit center.

13. The arrangement of claims 12 wherein the transmission apparatus on the premises of said second party communicates with the credit center via a cellular telephone base station.

14. A method comprising the steps of:

causing a wireless communication device controlled by a user to send signals to a provider, which signals identify the communication device, and which signals specify a credit amount;

receiving a signal from said provider to confirm credit for said user for said credit amount; and providing to said user a requested action in accordance with said credit amount, said requested action being an action other than an action associated with the establishment of communication between the user and another party.

* * * * *